Dec. 3, 1957     J. FRASER     2,815,149
APPARATUS FOR DISPENSING LIQUIDS

Filed July 11, 1955     7 Sheets-Sheet 1

INVENTOR
JOHN FRASER
BY
ATTORNEY

Dec. 3, 1957  J. FRASER  2,815,149
APPARATUS FOR DISPENSING LIQUIDS
Filed July 11, 1955  7 Sheets-Sheet 2

INVENTOR
JOHN FRASER
BY
ATTORNEY

Dec. 3, 1957  J. FRASER  2,815,149
APPARATUS FOR DISPENSING LIQUIDS
Filed July 11, 1955  7 Sheets-Sheet 3
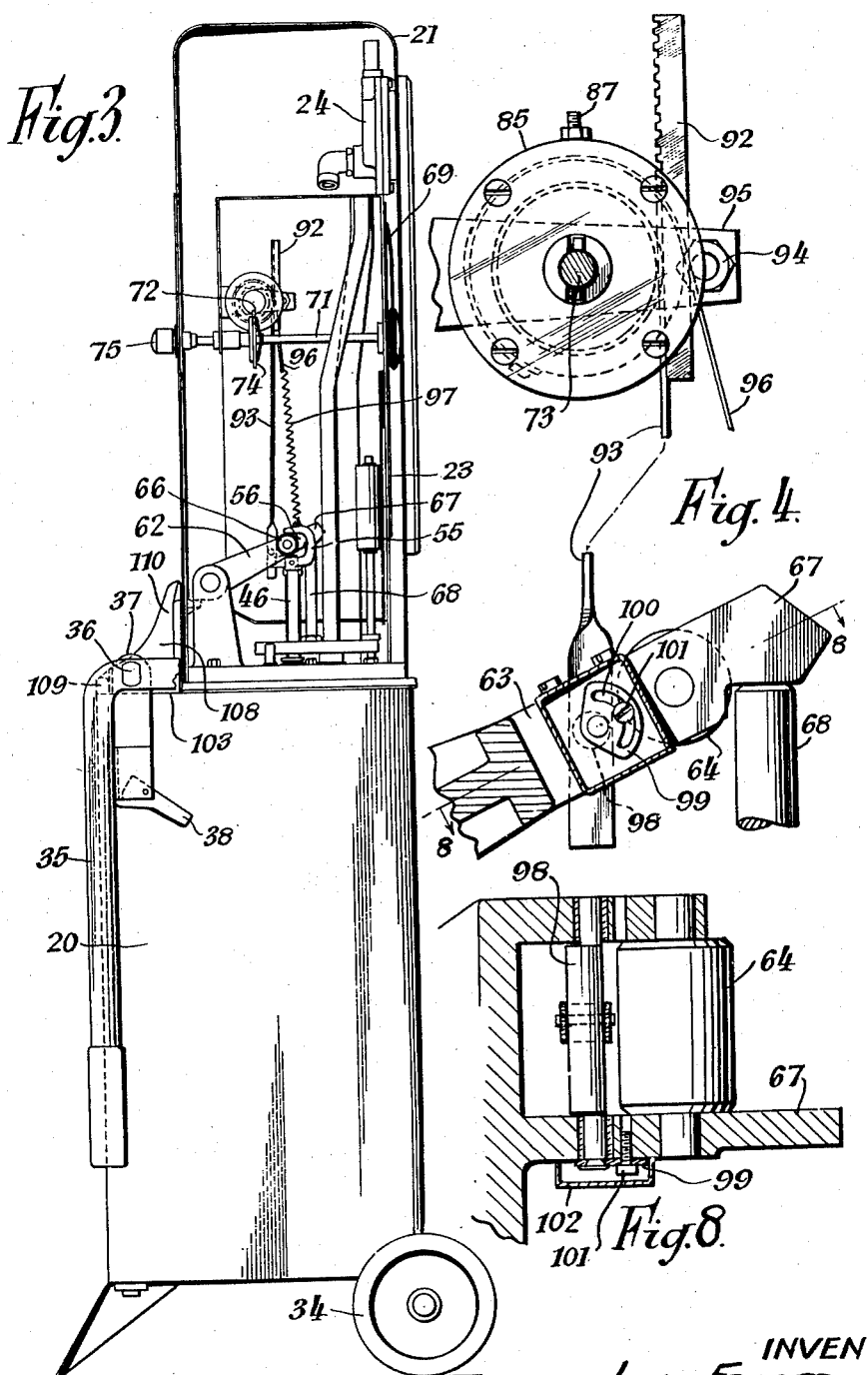
INVENTOR
JOHN FRASER
BY
ATTORNEY Dec. 3, 1957 J. FRASER 2,815,149
APPARATUS FOR DISPENSING LIQUIDS
Filed July 11, 1955 7 Sheets-Sheet 4
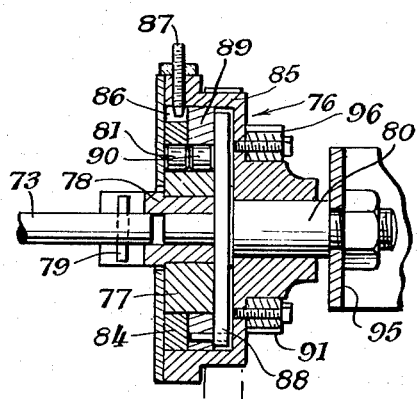
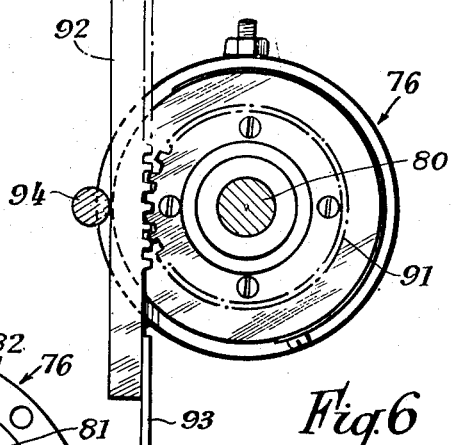
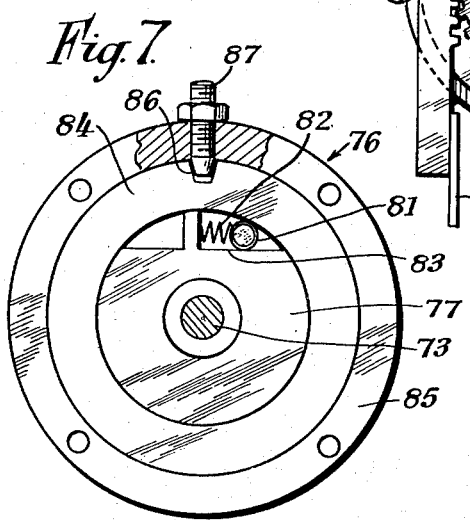
INVENTOR
JOHN FRASER
BY
ATTORNEY Dec. 3, 1957    J. FRASER    2,815,149
APPARATUS FOR DISPENSING LIQUIDS
Filed July 11, 1955    7 Sheets-Sheet 6
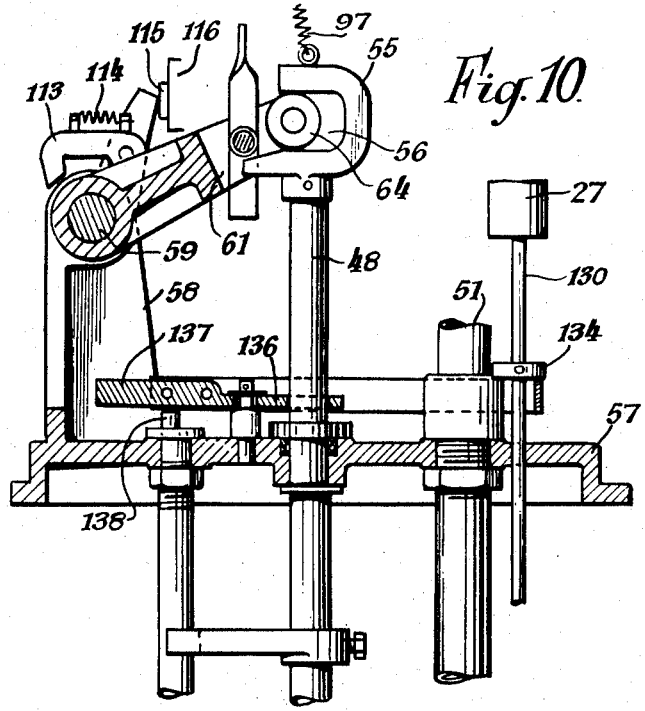
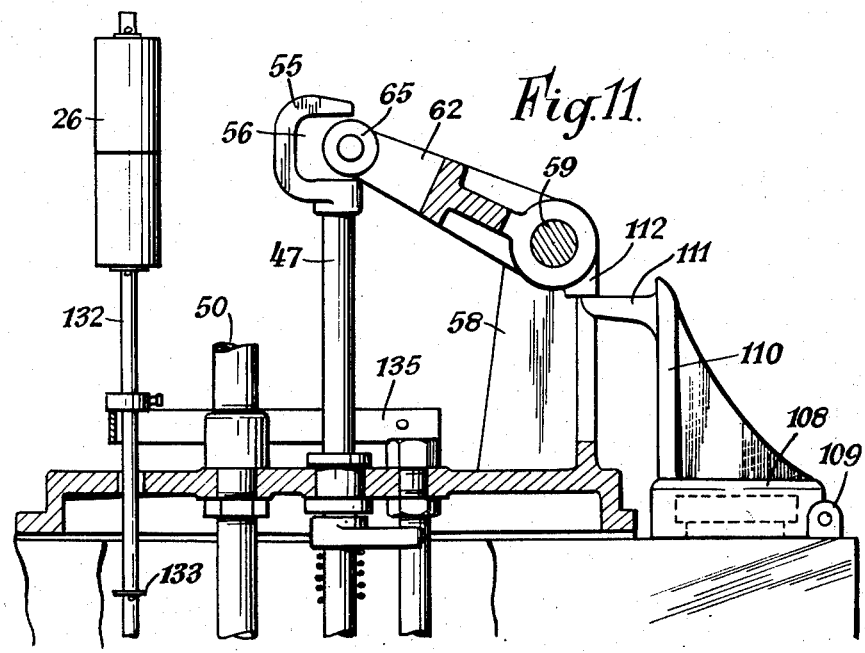
INVENTOR
JOHN FRASER
BY
ATTORNEY Dec. 3, 1957 J. FRASER 2,815,149
APPARATUS FOR DISPENSING LIQUIDS
Filed July 11, 1955 7 Sheets-Sheet 7

INVENTOR
JOHN FRASER
BY
ATTORNEY

United States Patent Office 2,815,149
Patented Dec. 3, 1957

2,815,149

APPARATUS FOR DISPENSING LIQUIDS

John Fraser, Surbiton, England, assignor to Avery-Hardoll Limited, Surbiton, England Application July 11, 1955, Serial No. 521,345

Claims priority, application Great Britain July 20, 1954

8 Claims. (Cl. 222—31)

This invention relates to apparatus for dispensing liquids, and more particularly but not exclusively to apparatus for dispensing a mixture of two liquids containing predetermined proportions of the said liquids. The apparatus is particularly suitable for dispensing a mixture of petrol and lubricating oil such as is commonly used in small internal combustion engines of the two-stroke type.

The object of the invention is to provide an apparatus for the purpose set forth which provides an accurate indication of the quantity of liquid dispensed.

According to one aspect of the invention, apparatus for dispensing a mixture of two liquids comprises a common delivery conduit, separate pumps to deliver the two liquids into said delivery conduit, operating means actuating both pumps simultaneously, through one movement transmitting means, indicating means driven by the pump operating means and connected to said operating means through a movement transmitting means other than that through which the pumps are actuated, both of said movement transmitting means having a degree of backlash or lost motion and means being provided for adjusting the said backlash or lost motion in one of said movement transmitting means.

According to another aspect of the invention, in apparatus for dispensing a mixture of two liquids by operating simultaneously separate pumps to deliver the two liquids into a common delivery conduit, the pumps and a quantity indicator are actuated by an operating means through separate transmitting means both having backlash or lost motion, the backlash or lost motion in one of said transmitting means being adjustable.

According to another aspect of the invention, apparatus for dispensing a liquid comprises a delivery conduit, a pump to deliver said liquid into said delivery conduit, operating means actuating the pump through one movement transmitting means, indicating means driven by the pump operating means and connected to said operating means through a movement transmitting means other than that through which the pumps are actuated, both of said movement transmitting means having a degree of backlash or lost motion and means being provided for adjusting the said backlash or lost motion in one of said movement transmitting means.

Additional means may be provided for adjusting the indicating means relative to the pump or pumps for calibration purposes.

The proportions of the liquids in the mixture may be determined by the relative areas of the pump plungers.

More than two pumps may be provided each delivering a different liquid, the pump operating means being permanently operatively connected to one of said pumps and being adapted for selective operative connection to the other pumps so that the liquid delivered by the one pump can be mixed with the liquid delivered by any one of the other pumps.

The pump or pumps preferably draw the liquids from tanks, means being provided for preventing operation of the said pumps if there is insufficient liquid in any one of the tanks.

The invention is hereinafter described with reference to the accompanying drawings, in which:

Figure 3 is a side view of the apparatus with the side of the upper casing removed;

Figure 4 is a detail view, on an enlarged scale, showing upper and lower parts of the driving mechanism for the indicator, the member extending between the said parts having its centre portion broken away;

Figure 5 is a cross-section through the one-way clutch shown in the upper part of Figure 4;

Figure 6 is a view of the upper part of Figure 4, looking in the opposite direction;

Figure 7 is an elevation, on a larger scale than Figures 4, 5 and 6, of the one-way clutch looking from the left-hand side of Figure 5, the cover of the clutch being removed;

Figure 8 is a sectional plan on the line 8—8 of Figure 4;

Figure 10 is a section on the line 10—10 of Figure 9;

Figure 11 is a section on the line 11—11 of Figure 9;

Figures 1, 14:
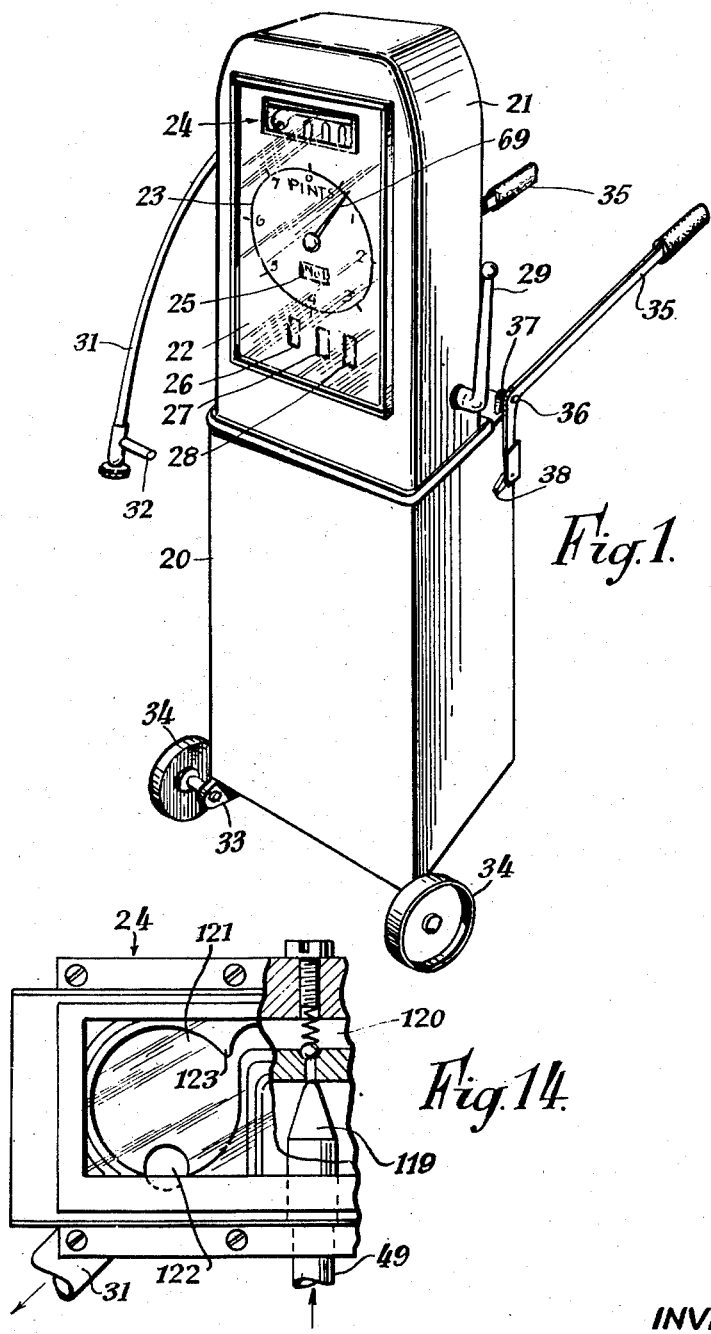
Figure 1 is a perspective view of one form of apparatus according to the invention.
Figure 14 is a detail view, in elevation, of the mixing chamber.

Referring to Figure 1 of the drawings, the apparatus comprises a lower casing 20 and an upper casing 21, the upper casing having a window 22 in its front wall through which are visible a quantity indicating dial 23, a mixing device 24, and indicators 25, 26, 27 and 28 the purpose of which will be described below. A pump handle 29 is mounted on a shaft projecting from one side of the upper casing 21, and a delivery hose 31, connected to the mixing device 24, passes through an opening in the other side of the casing, the free end of the hose having secured to it a hosecock 32. Brackets 33 at the bottom of the lower casing 20 carry two wheels 34, and two handles 35 are mounted on a shaft 36 pivotally mounted in brackets 37 at the top rear edge of the lower casing 20, the handles normally occupying the stowed position shown in Figures 2 and 3, in which they lie vertically against the sides of the lower casing 20, but being movable to the operative position shown in Figure 1 for moving the apparatus from place to place. A catch 38 is provided to retain the handles 35 in the operative position.

Figure 2:
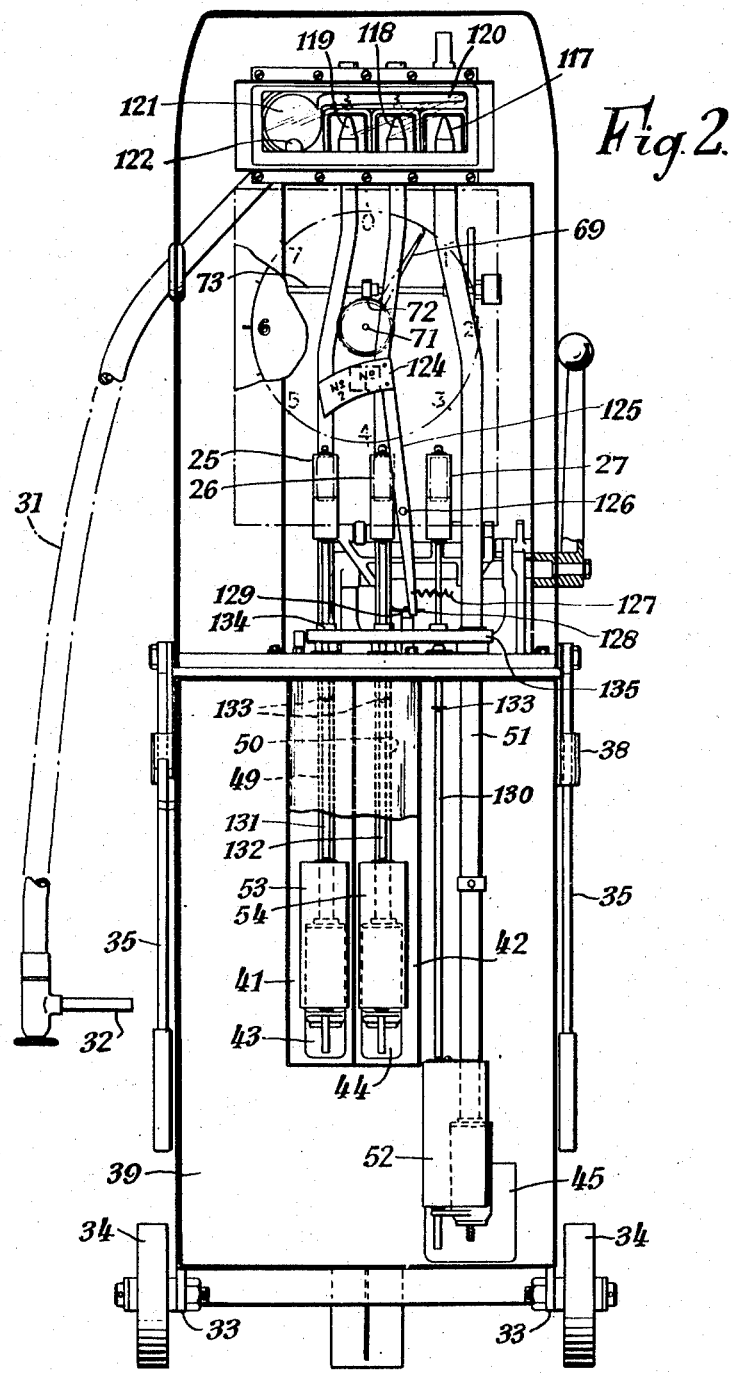
Figure 2 is a front view of the apparatus with the front walls omitted.
Figure 9:
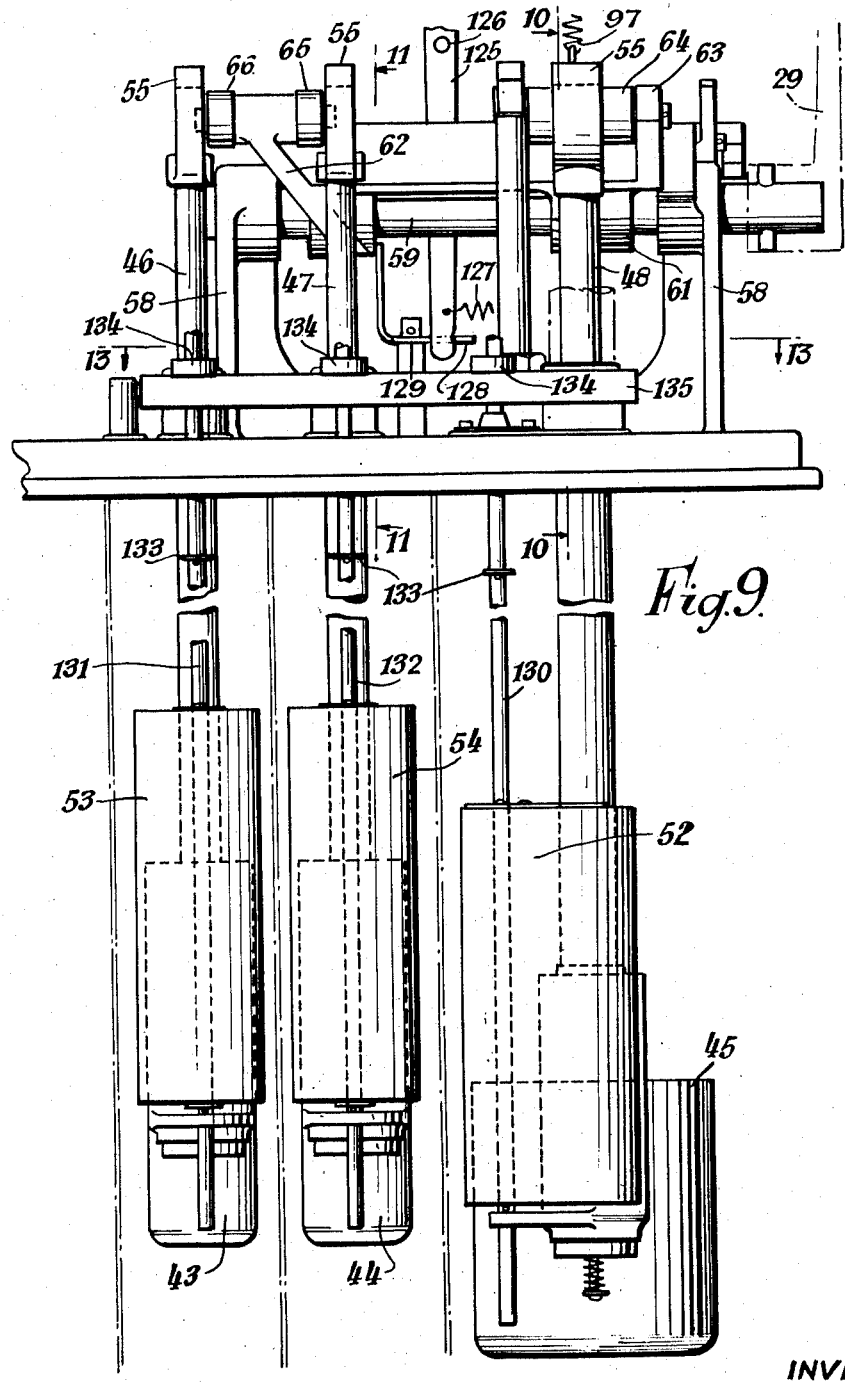
Figure 9 is a front elevation, on an enlarged scale, of part of the mechanism shown in Figure 2.
Figure 12:
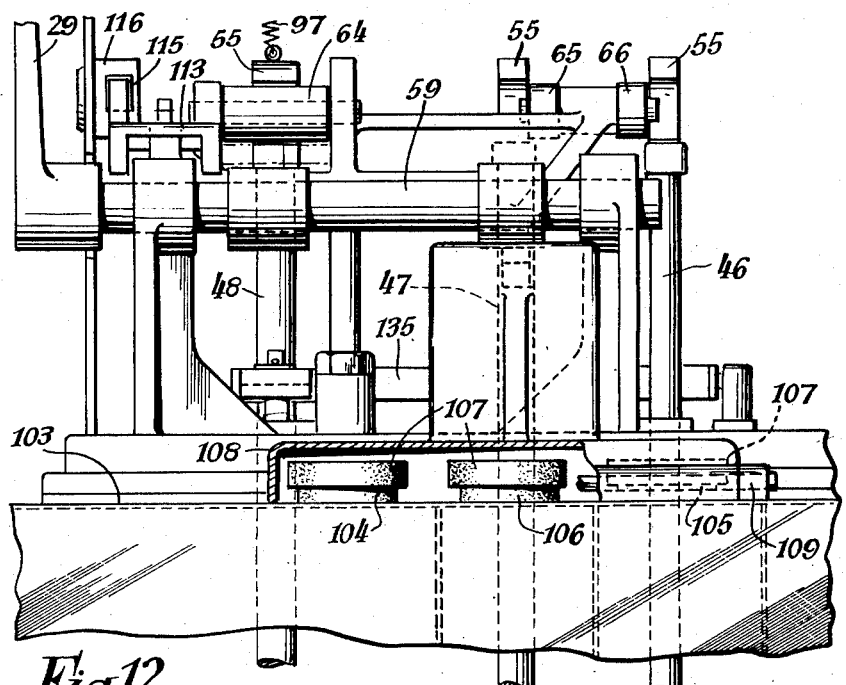
Figure 12 is a partial rear view of the mechanism shown in Figure 9.

The lower casing 20 constitutes a petrol tank 39 and has mounted within it two smaller tanks 41 and 42 placed side-by-side as shown in Figure 2, the tanks 41 and 42 being adapted to contain oil of different grades. The front walls of the tanks 41 and 42 are broken away in Figure 2. In each of the tanks 39, 41 and 42 there is mounted, near the bottom, a single-cylinder, single acting reciprocating pump, the pumps 43 and 44 in the oil tanks 41 and 42 having pistons of equal area, and the pump 45 in the tank 39 having a piston of larger area. The delivery strokes of the pumps are affected by downward movement of rods 46, 47 and 48 (Figures 9 and 12) extending upwardly into the upper casing 21, and the liquid delivered by the pumps 43, 44 and 45 passes upwardly through pipes 49, 50 and 51 respectively to the mixing device 24. In each of the tanks 39, 41 and 42 there is a float acting, as hereinafter described, to prevent operation of the apparatus if there is insufficient liquid in any one of the tanks, the floats being shown at 52, 53 and 54.

The rods 46, 47 and 48 operating the pumps 43, 44 and 45 are all in the same vertical plane, and each one of them has fixed to its upper end a head 55 formed with a rearwardly opening notch 56 (Figures 10 and 11). A horizontal plate 57 mounted at the bottom of the upper casing 21 carries pedestals 58 in which is mounted for rotation the shaft 59 to which the handle 29 is fixed, this shaft extending transversely across the casing and carrying two radial arms 61 and 62. The radial arm 61 has a forked end 63 between the limbs of which is mounted an elongated roller 64, and the radial arm 62 carries two spaced rollers 65 and 66, all of the rollers 64, 65 and 66 being co-axial. The rods 46 and 47 are urged upwardly by springs (not shown), acting on the pistons of the pumps, their upward movement being limited by stops so that the notches 56 are in alignment when the rods are in their uppermost positions. The shaft 59 is slidable in its bearings. The roller 64 engages in the notch 56 of the head on the rod 48, and is long enough to remain in engagement therewith throughout the sliding movement of the shaft 59, but the rollers 65 and 66 are so positioned that, when the shaft 59 is at one end of its sliding movement the roller 65 engages the notch 56 of the head on the rod 47 whilst the roller 66 is laterally displaced from the notch 56 of the head on the rod 46, whereas when the shaft is moved to the other end of its sliding movement the roller 66 is in the notch 56 of the head on the rod 46, and the roller 65 is laterally displaced from the notch in the head on the rod 47. In an intermediate position of the shaft 59, both rollers 65 and 66 are displaced from the respective notches. The parts are shown in this position in the drawings. Thus, when the shaft 59 is at one end of its movement, turning of the said shaft effects operation of the petrol pump 45 and one of the oil pumps, and when the said shaft is at the other end of its movement it operates the petrol pump and the other oil pump. To prevent turning of the shaft 59 in any intermediate position, an extension 67 of the arm 61 co-operates with a stop 68 in the form of a rod upstanding from the plate 57, as shown in Figure 4, the extension 67 moving clear of the stop 68 when the shaft 59 moves to either of its extreme positions.

The rollers 64, 65 and 66 have a small degree of clearance in the notches 56, so that there is a slight degree of lost motion between the handle 29 and the pumps 43, 44 and 45.

A pointer 69 co-operating with the dial 23 is mounted on a horizontal spindle 71 extending rearwardly across the upper casing 21, the spindle 71 being driven through skew gearing 72 from a transverse horizontal spindle 73. The driven member of the skew gearing drives the spindle 72 through a friction clutch 74, so that the spindle 71 can be turned independently of the spindle 73 for zeroising the pointer 69, by means of a knob 75. The spindle 73 is rotated by downward movement of the arm 61, through a one-way clutch 76 of the wedging roller type. The driven member 77 of the clutch 76 (Figures 5 and 7) includes a sleeve 78 keyed at 79 to, and projecting from the end of, the spindle 73, the projecting end of the sleeve 78 being located on a fixed stub spindle 80 co-axial with the spindle 73. The wedging roller 81 of the clutch is urged by a spring 82 to wedge between a flat surface 83 on the driven member 77 and the internal surface of a driving ring 84, the driving ring being housed in a casing 85 rotatably mounted on the stub spindle 80. The driving ring 84 is formed with a tapered notch 86 into which projects the frusto-conical tip of a screw 87 mounted radially in the casing 85 to provide a driving connection, with adjustable lost motion, between the casing 85 and the driving ring. A disk 88 fixed to the stub spindle 80 has secured to it a ring 89 lying alongside the driving ring 84, a second wedging roller 90 (Figure 5) being provided between the ring 89 and the driven member 77 to hold the driven member of the clutch against backward rotation. A pinion 91 mounted on the casing 85 is engaged by a rack 92 secured to the upper end of a link 93, the lower end of which is pivotally coupled to the arm 61, the rack 92 being held in engagement with the pinion by a roller 94 mounted on a support 95 for the stub spindle 80. In order to take up any lost motion between the rack 92 and the pinion 91, a flexible metal band 96 secured at one end to the casing 85, and wrapped round the said casing, is coupled to a spring 97 the other end of which is coupled to the head on the rod 48. Thus there is no lost motion between the handle 29 and the pointer 69 except between the casing 85 and the clutch driving ring 84. The lost motion between these two parts being adjustable, it can be set to match exactly with the lost motion between the roller 64, and the rod 48, so that the commencement of delivery of liquid coincides precisely with the commencement of movement of the pointer, and a true indication of the quantity delivered is provided whether the handle 29 is operated in long or short strokes.

The lower end of the link 93 is coupled to the arm 61 by means of an eccentric spindle 98 so that the initial relation of the pointer 69 to the arm 61 can be adjusted, the spindle 98 having fixed to one end a quadrant 99 formed with an arcuate slot 100 through which passes a clamping screw 101 entering a screw-threaded hole in one arm of the fork 63. A detachable cover 102 encloses the quadrant 99.

The lower casing 20 projects rearwardly beyond the upper casing 21 to provide a ledge 103 through which project filling necks 104, 105, 106 for the tanks 39, 41 and 42 respectively, the necks 104, 105 and 106 being closed by caps 107. A cover 108, hinged at its rear edge at 109, covers the filler necks, and a bracket 110 on the cover 108 carries a dog 111 which, when the shaft 59 is in its mid position, projects underneath a lug 112 on the boss of the arm 62 (Figure 11), thus preventing the cover 108 from being lifted. The shaft 59 can be held in the mid position by a fork 113 (Figures 10 and 12) the arms of which engage between one of the pedestals 58 and the handle 29 and the boss of the arm 61 respectively, the fork 113, which is normally held in a position leaving the shaft 59 free to slide by a spring 114 (Figure 10), being urged to its operative position by a plunger 115 associated with a rotary barrel type lock 116. As the handle 29, when the shaft 59 is in its mid position, is held against movement to operate the pumps by the stop 68, the lock 116 both prevents operation of the pumps and prevents access to the tanks.

The mixing device 24 comprises three compartments 117, 118 and 119 into which lead the pipes 51, 50 and 49 respectively, each of the compartments having at its upper end an opening leading into a narrow horizontal channel 120. Upwardly opening non-return valves are provided in the openings leading from the compartments 118 and 119. The channel 120 leads into a cylindrical mixing chamber 121 having an outlet 122 to which the hose 31 is connected, a baffle 123 being provided in the mixing chamber 121 to deflect the entering liquid, and cause it to whirl round in the mixing chamber. Since the petrol is supplied to the compartment 117, it flows through the channel 120 over the outlets from the compartments 118 and 119, and receives the oil delivered from one of those compartments, the whirling of the petrol and oil in the mixing chamber 121 ensuring that they are thoroughly mixed. The front of the mixing device is constituted by a transparent panel, so that the movement and mixing of the liquids can be seen.

The indicator 25 comprises a flag 124 mounted on an arm 125 pivoted at 126 behind the dial 23, and bearing markings one or other of which is visible through an opening in the dial to show which of the two oils is being supplied. The arm is urged by a spring 127 to a position in which one marking is behind the opening, and is rocked to the other position by a striker 128 pivoted at 129 on the plate 57 and engaging the boss of the arm 62 on the shaft 59.

Figure 13:
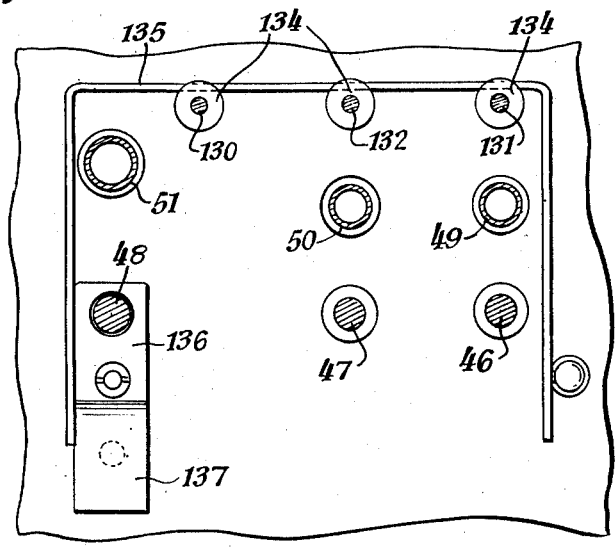
Figure 13 is a partial sectional plan view on the line 13—13 of Figure 9.

The floats 52, 53 and 54 carry upwardly extending rods 130, 131 and 132 respectively, the rods passing upwardly through the plate 57 and carrying the indicators 27, 25 and 26 respectively. The floats are normally lifted by the liquid, their upward movement being limited by stops 133 on the rods 130, 131 and 132, and fall when the tanks are nearly empty, the indicators being suitably marked to show a warning signal through openings in the dial when the floats fall. Each of the rods 130, 131 and 132 also has fixed to it a collar 134. Mounted for pivotal movement about a horizontal axis on the plate 57 is a bar 135, bent to substantially a U-shape as shown in Figure 13, the bar 135 having fixed to it a plate 136 formed with a hole through which passes, with small clearance, the petrol-pump operating rod 48. An extension 137 of the plate 136 forms a counterweight tending to rock the bar 135 anti-clockwise about its pivot as viewed in Figure 10, a stop 138 being provided to limit such movement at a position in which the rod 48 passes freely through the hole in the plate 136. The collars 134 are so positioned with relation to the bar 135 that, when the floats drop owing to emptying of the tanks, the collars engage the upper edge of the bar and rock it, clockwise in Figure 10, so that the plate 136 cross-locks on the rod 48, and prevents the apparatus from being operated. The weight of the floats is such that any one of them alone can rock the bar 135 to the locking position, and therefore the apparatus can operate only if none of the tanks are empty, and there is no danger of delivering only one of the liquids.

The arms 61, 62 and the rods 46, 47, 48 constitute a first movement transmitting means between the shaft 59, which constitutes the pump operating means, and the pumps, whilst the link 93, rack 92, casing 85, spindle 73, skew gearing 72 and spindle 71 constitute a second movement transmitting means between the shaft 59 and the indicating means constituted by the pointer 69. A constant lost motion exists in the first movement transmitting means owing to the clearance between the roller 64 and the forked head of the pump operating rod, and the only lost motion in the second movement transmitting means is between the casing 85 and the driving ring 84 of the one-way clutch. The latter lost motion is adjustable by means of the screw 87, so that the degree of lost motion in both transmitting means can be made equal.

To operate the apparatus, the shaft 59 is moved axially to engage the roller 65 or 66 with the head on the rod 46 or 47, depending which grade of oil is required, and the handle 29 is moved to urge the rods downwardly and operate the pumps. The third pump operating rod remains idle. The proportion of oil to petrol is determined by the relation between the areas of the pump pistons.

More than two oil tanks, each with its own pump and operating rod, may be provided, the shaft 59 being movable axially to positions in each of which a different one of the oil pumps is operated.

Apparatus according to the invention may be employed for delivering relatively small quantities of a single liquid, only, one pump then being provided, and the mixing device being omitted together with the means for selecting one or other of two alternative liquids for admixture with a third.

I claim:

1. Apparatus for dispensing a mixture of two liquids comprising a common delivery conduit, separate pumps to deliver the two liquids into said delivery conduit, operating means actuating both pumps simultaneously, through one mechanical movement transmitting means, indicating means driven by the pump operating means and connected to said operating means through a mechanical movement transmitting means other than that through which the pumps are actuated, both of said movement transmitting means having a degree of backlash and means being provided for adjusting the said backlash in one of said movement transmitting means.

2. Apparatus for dispensing a liquid comprising a delivery conduit, a pump to deliver said liquid into said delivery conduit, operating means actuating the pump through one mechanical movement transmitting means, indicating means driven by the pump operating means and connected to said operating means through a mechanical movement transmitting means other than that through which the pumps are actuated, both of said movement transmitting means having a degree of backlash and means being provided for adjusting the said backlash in one of said movement transmitting means.

3. Apparatus according to claim 1, wherein additional means are provided for adjusting the indicating means relative to the pumps for calibration purposes.

4. Apparatus according to claim 1, wherein more than two pumps are provided, each delivering a different liquid, the pump operating means being permanently operatively connected to one of said pumps and being adapted for selective operative connection to the other pumps so that the liquid delivered by the one pump can be mixed with the liquid delivered by any one of the other pumps.

5. Apparatus according to claim 1, wherein means are provided for mixing the liquids during delivery.

6. Apparatus for dispensing a mixture of two liquids comprising two separate pumps, each consisting of a cylinder and a piston movable in the said cylinder, a common delivery conduit into which liquid is delivered by both pumps, operating rods connected one to each piston, a shaft, means for effecting rotational movement of said shaft, arms fixed to said shaft, means interconnecting said arms and said operating rods so that the pistons are moved to and fro in the cylinders by oscillatory movement of said shaft, a link pivotally connected to one of the arms, a quantity indicator, means actuated by movement of said link to operate said quantity indicator and means for providing an adjustable degree of backlash in said quantity indicator operating means whereby the backlash in said last-mentioned means is adjustable to correspond with backlash inherent in the connections between the arms and the operating rods.

7. Apparatus as claimed in claim 6, in which the quantity indicator operating means comprises a one-way clutch including a driving ring, a driven member and wedging balls co-operating with said driving ring and driven member, a casing, means for converting longitudinal movement of said link into turning movement of the casing, and means for transmitting rotation from said casing to said driving ring, said rotation transmitting means being adjustable to provide variable lost motion between said casing and driving ring.

8. Apparatus as claimed in claim 7, the means for converting longitudinal movement of said link into turning movement of said casing comprising a rack on said link and a pinion fixed to said casing, and resilient means applying torque to said casing to take up backlash between said rack and said pinion.

References Cited in the file of this patent

UNITED STATES PATENTS

| | | |
|---|---|---|
| 1,317,232 | Spillman | Sept. 30, 1919 |
| 1,837,719 | Larson | Dec. 22, 1931 |
| 1,934,623 | Frick | Nov. 7, 1933 |
| 1,964,028 | Boynton et al. | June 26, 1934 |
| 1,968,338 | Earles et al. | July 31, 1934 |
| 2,078,486 | Eastman | Apr. 27, 1937 |
| 2,282,945 | Demerest et al. | May 12, 1942 |
| 2,474,748 | McMurray | June 28, 1949 |